United States Patent [19]

Paul

[11] 4,079,887
[45] Mar. 21, 1978

[54] TEMPERATURE CONTROL SYSTEM

[75] Inventor: Steven W. Paul, Laurel, Iowa

[73] Assignee: Dunham-Bush, Inc., West Hartford, Conn.

[21] Appl. No.: 665,477

[22] Filed: Mar. 10, 1976

[51] Int. Cl.² ............................................. F24D 1/00
[52] U.S. Cl. ................................. 237/9 R; 236/91 F; 318/165
[58] Field of Search ......................... 236/91 G, 91 F; 73/93 R; 318/165; 237/9, 8 R

[56] References Cited

U.S. PATENT DOCUMENTS

| | | | |
|---|---|---|---|
| 2,362,977 | 11/1944 | Crosthwait et al. | 73/193 R |
| 2,431,790 | 12/1947 | Crosthwait et al. | 318/65 |
| 3,054,562 | 9/1962 | Werts | 236/91 G |

Primary Examiner—William E. Wayner
Assistant Examiner—Robert J. Charvat
Attorney, Agent, or Firm—Sughrue, Rothwell, Mion, Zinn and Macpeak

[57] ABSTRACT

A temperature control system for monitoring and controlling a zone supplied with low pressure steam is disclosed. The system comprises a series of balanced Wheatstone bridges which, when calibrated, provide a variety of manual and automatic control conditions to maintain the temperature in the zone. Means are provided for obtaining direct readings of room or zone temperature, and monitoring the position and movement of a steam control valve which is utilized as the heat metering apparatus. In order to compensate for environmental differences which may exist in various zones under control, there is disclosed apparatus for selectively varying the effect of sensors utilized in the system, and in particular, the effect of a resistance thermometer located within the zone which may be subject to variations in accuracy in terms of placement.

10 Claims, 2 Drawing Figures

TEMPERATURE CONTROL SYSTEM

BACKGROUND OF THE INVENTION

1. Field of the Invention

This invention relates to a resistance type temperature control system, and, in particular, to a system utilizing one or more condition responsive elements as part of an impedance network adapted to control the temperature in a variety of installations.

2. Prior Art

Apparatus and systems operating on resistance thermometer principles are well known and documented in the prior art. In particular, this invention constitutes an improvement over U.S. Pat. Nos. 2,362,977 and 2,431,790, issued on the joint inventions of David N. Crosthwait, Jr. and Everett W. Werts, on Nov. 21, 1944 and Dec. 2, 1947, respectively. Additionally, this invention represents an improvement over U.S. Pat. No. 2,260,135 to Werts and a later patent, U.S. Pat. No. 3,054,562, issued on Sept. 18, 1962. All of these prior art patents have been assigned to Dunham-Bush, Co., the assignee of this invention. Those prior art patents were directed to a variety of systems which were utilized to control the temperature in buildings, which utilized low pressure steam as the basic heating medium.

In the prior art, it has been recognized that systems operating on resistance thermometer principles are exceptionally sensitive and respond to minute electrical imbalances. Consequently, control systems operating on electrical bridge principles required skilled instrument technicians to insure continuity and stability of operation. Generally, however, for successful application to building temperature control, in situations where diverse skills and talents among those operating the system are common, such systems must be fabricated, installed, operated and maintained by persons who are not thoroughly familiar with the intricate operating techniques of the systems. In the prior art patents cited above, the control systems provide a construction and arrangement wherein a balanced resistance or resistance thermometer type control system is so constructed and arranged that it may be installed and operated by unskilled personnel. Despite the success achieved by those systems, areas of improvement exist.

For example, the efficient operation of a heating system requires that the operation of the temperature control equipment be accessible to and under the supervision of heating system operators. However, certain condition responsive elements must be located at remote points where they are under the influence of environmental conditions to be regulated. Also, portions of the system which require manipulation or adjustment during the operation of the system are located at a different location and, preferably, in the boiler room or at some central point in the building, while the condition responsive devices are located in each discrete compartment or other spaces where the temperature is to be controlled.

Given this wide diversity in location, the prior art has sought to establish effective control through a number of stabilization and compensation techniques.

In the basic system patent, U.S. Pat. No. 2,326,977, a temperature sensitive resistance thermometer is mounted on the inside surface of a pane of window glass in the environmental area to be controlled. The controller circuitry reacts to the inner surface temperature of the glass as a measure of the heat requirements of that area as determined by prevailing outdoor conditions, inside air temperature and mean radiant temperature of interior parts of the area. Through the use of a pair of temperature sensitive resistances, one mounted below and the other above the heating element in a convector type of heating unit, the controller reacts to the rise in temperature of the air stream passing through this heating element as a measure of the rate of heat output from the heating system. Additionally, in the Crosthwait system, a mechanically operated potentiometer is utilized to adjust a motor which operates the control valve in the system such that this potentiometer is in synchronism with the particular valve. Hence, the reactor is responsive to the degree of opening of the control valve, and by combinations of the ennumerated sensing circuits in Wheatstone bridge circuits, a variety of automatic controls are achieved.

In an improvement of the Crosthwait system, U.S. Pat. No. 2,620,135 attempted to overcome the problem of distance in a typical operating condition wherein lengthy conductive paths were required between distantly located control responsive elements and the centrally located control panel. As pointed out in the specification of that patent, in typical operations, condition responsive elements could be placed 5,000 feet or more from the control panel, and in a situation where a number of leads were required, the length of wire would become inordinately large. Also, the problem of sensitivity in the Wheatstone bridge configurations was the subject of the improvement in the Werts (U.S. Pat. No. 2,620,135) application. As pointed out, the bridge circuitry is very sensitive to small electrical imbalances, and residual resistance due to corrosion, loose contact, etc. at the point of contact between the sliding arm of the potentiometer and the resistor portion of the potentiometer will upset the bridge balance when the potentiometer is in a bridge arm. To eliminate this problem, the Werts invention eliminates the use of potentiometers in the bridge arms themselves so that there is no possibility of unbalance occurring because of varying resistances in the sliding context of the potentiometers. The remote arms of the bridge are interconnected, and, accordingly, the effects of lead compensation are obtained with fewer connecting wires from remote arms to the other branches than in the prior art Crosthwait arrangement. Since the conductors in the circuit act as junctions of the bridge branches, they preserve the effects of lead compensation while at the same time eliminating the necessity of providing certain separate compensating leads.

A similar improvement, found in U.S. Pat. No. 2,891,218, dealt with utilizing the remotely located elements, but substituting alternating current for the prior utilized direct current source. As is well known, a bridge circuit utilizing alternating current is inoperative unless the capacitance factor is compensated, and the Werts U.S. patent (No. 2,891,218) makes this compensation possible by the location of the resistors 24 adjacent to the resistance thermometer 21 and connecting it with comparable leads 25 and 26 in the arm 18 of the bridge, as shown in FIG. 1 of U.S. Pat. No. 2,891,218. With an arrangement as shown in FIG. 1, leads 25 and 26 provide not only the necessary resistance balance, but also the capacitance between the leads and between the leads and the ground, which would then be the same as in the arm 17 of the FIG. 1 bridge. Hence, the bridge circuitry of the U.S. Pat. No. 2,891,218 utilizing alternating current finds itself as an improvement in the state of the art since amplication techniques available in AC circuits are thereby made available for utilization in the temperature control circuit, which would not be previously utilized if direct current were the power source in the system.

SUMMARY OF THE INVENTION

While commercial embodiments of these prior art patents have achieved commercial success, substantive areas of improvement remain. For example, some control panels utilized mechanical timers to effectuate a sequence of control operations, and these timers could prove to be unreliable components of the system. These mechanical timers, known as "duty cycle timers," were utilized to selectively switch in and out of Wheatstone bridges, sensors to determine whether control was being achieved within defined limits in the system. Additionally, in other applications, no actual measurement within the area to be heated was made, and heat was supplied solely as a basis of demand as a function of outside temperature.

In other applications, where a resistance thermometer was utilized to provide an actual measure of temperature in the circuit, in some instances, this thermometer could lead to erroneous readings. While the utilization of resistance thermometers in the control circuits to provide an actual basis for temperature of the area to be heated is a clear advantage over the prior art systems, nevertheless, the imposition of additional resistance elements provides complications in terms of bridge circuitry. Additionally, if these thermometers were located in environmentally poor locations, for example, such as in drafts or in direct sunlight, their readings would not be accurate vis-a-vis the temperature of the entire area. Nevertheless, in many situations where resistance thermometers were utilized as a part of the control circuitry, no technique was available for balancing these thermometers within the bridge networks. Architectural constraints, such as wall location, component installations such as heat duct work, electricity and plumbing, made positioning of these thermometers relatively inflexible. Accordingly, in situations where the positioning of the thermometer gave rise to erroneous readings, it was impossible to adequately reflect these readings in a balanced manner throughout the control system.

Accordingly, it is an object of this invention to provide a temperature control system having controllability over a wide range of positions for resistance thermometers in such systems.

It is another object of this invention to provide an improved control system for utilization in low pressure steam heating units.

Still another object of this invention is to provide a resistance thermometer control network wherein the effects of the thermometer can be selectively varied to compensate for differences in actual temperature as a consequence of location of that thermometer.

A still further object of this invention is to provide a composite control system for regulating the supply of steam to an area which is to be heated.

These and other objects and advantages of this invention will be more apparent from the following detailed descriptions of a system designed according to this invention.

DESCRIPTION OF THE PREFERRED EMBODIMENT

Figure 1:
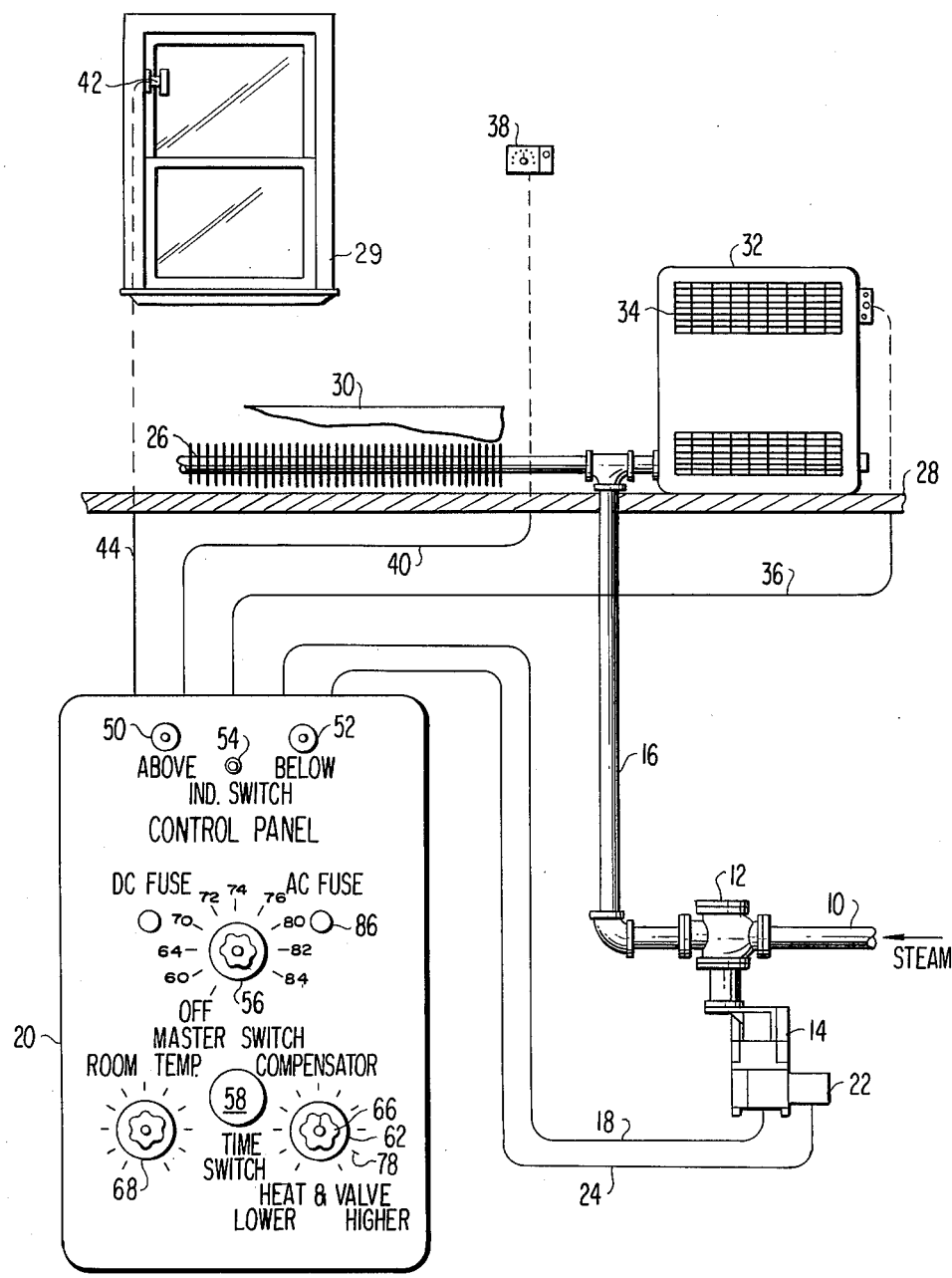
FIG. 1 is a diagramatic layout of a heating system with the improved control and indicating system applied thereto.

Referring now to FIG. 1, a diagramatic layout of a heating system utilizing the present invention is shown. It should be understood that these systems generally utilize low pressure steam as the heating media, such steam being delivered from a boiler or generator (not shown) through a main 10 to a control or reducing valve 12. A motor assembly 14, schematically shown in FIG. 1, is utilized to modulate the position of valve 12 to thereby establish a controlled flow of steam at reduced pressure through a supply main 16. A cable 18 couples the motor control assembly 14 to the main control panel 20. Additionally, a valve position indicating potentiometer 22 is associated with the motor assembly 14 and is coupled to control panel 20 by means of conduit 24.

Steam from the supply main 16 is distributed to several individual radiators in the heating system, shown schematically as elements 26 in the area to be heated. It is appreciated that these radiators can be located at points remote from the control panel, as shown in FIG. 1 schematically by the floor separation 28. Additionally, not shown are outlet traps through which condensate and air are drawn out of the radiator in the area to be heated back through return pipes into an accumulator tank, also not shown. Various radiators can be utilized, such as ordinary room radiators or, as shown in FIG. 1, radiator 26 partially concealed under window 29 in wall 30, shown partially broken away.

As shown in FIG. 1, a heat balancer device 32 is utilized for measuring the heat output of the system. This device, as shown in FIG. 1, is generally in the form of a small radiating unit enclosed in a casing through which air flows out of grills 34. Thermostatic elements are positioned in heat balancer 32 and are connected by cable 36 to the control panel 20. A room thermostat 38 is positioned in the area to be heated and is coupled to control panel 20 by means of cable 40. Also, a window selector 42 is mounted on window 28 and coupled by means of cable 44 to the control panel 20. The interaction and functioning of these elements will be discussed in greater detail herein.

In its most basic terms, the control equipment shown in FIG. 1 regulates the supply of heat through main 16 by controlling the admission of steam through the control valve 12. The heating results depend upon the distribution of heat by the heating system, typified by radiator 26, under the control of a vacuum pump and differential controller (not shown). The control panel 20 is the central control operating station for the system defined in FIG. 1. The control panel 20 contains settings which are made and from which readings of room temperature, control valve openings and the rate of heat supply may be taken. The lighting of indicating lamps 50 and 52 indicates the temperature or heating condition existing in the zone under control. The master switch 56 of the control panel 20 is the control selector switch and has ten stations enabling the controls to be set to perform any one of six control functions or three indicate functions. The tenth switch is the off condition. In the off condition, all control and indication functions are inoperative and the control valve 12 remains in the position it was in at the time the master switch 56 was turned off. Only a time switch motor continues to run to provide a running time for time switch 58. The other nine positions of the master switch 56 will now be described.

In the "valve set" position, shown generally at 60, the control valve is positioned in a series of steps to the percentage of opening for which the heat and valve dial 62 is set. In a rapid series of openings, for example, three times per minute, the control valve is corrected until the desired opening is obtained.

In the clock control position, generally indicated at 64, the operation of controls is automatically transferred for three periods of heating, namely, day, night and heat-up, in accordance with the time schedule for which the time mechanism 58 is set. During the day period, the steam supply is regulated by maintaining a balance between the heat demand as measured by the selector 42 and the heat supply as measured by the heat balancer 32. Also, the heat supply is varied by the setting of the compensator dial knob 66 on the compensator 62 and the amount of difference between the temperature at the resistance thermometer 38 and the setting of the room temperature knob 68. The room temperature knob is calibrated in degrees Fahrenheit. The day period of operation under clock control 64 is the same as obtained when the master switch 56 is set to day control which is generally indicated at 72.

During the night period, the steam supply is regulated by the same controlling devices that control during the day period, except that the night adjustment decreases the rate of heat supply to give a lower controlling temperature. The operation is the same as obtained when the master switch 56 is set to night control generally indicated by the number 70. Similarly, there is a heat up period when the steam supply is regulated by the same controlling devices that control during the day period, except that a heat up adjustment is utilized as a compensating adjustment to set up the amount of increase in the rate of heat supply during this period.

The night control setting, generally indicated at 70, is utilized to regulate the steam supply by the control circuit to supply a lower level of heat to balance the heat demand. A night adjustment, not shown, is utilized to vary the amount of decrease in the controlling temperature from day settings. Accordingly, when control is transferred from day to night, the steam supply is greatly reduced. As the room temperature as measured by the resistance thermometer 38 falls nearer the range of the night controlling temperature, more steam is admitted as required to balance the decreased rate of heat supply with heat demand.

The day control, indicated by element 72 on the master switch, is utilized to regulate the steam supply to maintain room temperature within desired limits by maintaining a balance between the heat demand as measured by the selector 42 and the heat supply as measured by the heat balancer 32. Also, the heat supply is varied by setting of the compensator dial knob 66 and the amount of difference between the temperature at the resistance thermometer and the setting of the room temperature knob 68.

In accordance with electronic amplifier circuitry, not shown, three times each minute checks are made to determine whether the heat supply is balanced with the heat demand in accordance with settings previously mentioned. The indicator lamps 50 and 52 show whether the opening of the control valve 12 is "ABOVE" or "BELOW" that which is necessary to maintain a balance between the heat demand caused by the weather and measured by the selector and the heat supply as measured by the heat balancer 32. The control valve 12 is accordingly moved in the direction to balance the heat supply and demand in a manner to be more fully discussed herein. If the "BELOW" lamp 52 lights, the opening of the control valve is less than that necessary to maintain a balance between the heat demand and the heat supply so the control valve is opened a small amount. In contrast, if the "ABOVE" lamp 50 lights, the opening of the control valve is more than necessary to maintain a balance between the heat demand and the heat supply, and the control valve is then closed by a small amount. If neither of the indicating lamps 50-52 light, the opening of the control valve is correct to maintain a balance between the heat demand and heat supply. Accordingly, the control valve remains at whatever position it may have previously taken.

If the temperature at the resistance thermometer 38 is different than the setting of the room temperature dial 68, the heat supply will be slightly increased or decreased. The amount of effect of a charge in the temperature at the resistance thermometer on the opening of the control valve can be varied. This variation of effect of the resistance thermometer on the opening of the control valve forms a salient aspect of this invention. In particular, if the resistance thermometer is located in an area of the zone under control which does not provide accurate readouts at all times (or consistently), it becomes important for the proper balance of the system to vary the control of the resistance thermometer on the opening and closing of the control valve.

During day control, the compensator dial knob 66 can temporarily be changed to vary the rate of heat supply to the building during unusual or abnormal weather conditions. In its normal setting, the dial knob 66 is in a vertical position, and with adjustments, to be discussed in detail herein, correctly set, the compensator should not need to be varied.

The next setting on the master switch 56 is the temperature indicate position 74. Temperature at the resistance thermometer may be read directly from the room temperature dial 68 by pressing the indicator switch 54 and moving the room temperature dial 68 until neither the "ABOVE" or "BELOW" indicating lamps 50, 52 light up. The temperature indicated at this point in time by the knob on the room temperature dial 68 is then the room temperature at the resistance thermometer. If more than one resistance thermometer unit is utilized, the average temperature will then be indicated.

The next setting on the master switch 56 is the heat indicate position 76 in which the percent of heat emission from the heat balancer 32 may be read directly from the heat and valve dial 62 by pressing the indicator switch 54 and moving the heat and valve dial knob 66 until neither of the indicating lamps 50 and 52 is illuminated. Indicia 78, disposed on the periphery of the heat and valve dial, will then indicate the percentage of heat emission.

The valve indication, in terms of opening of the control valve 12 by percentages, can be read directly when the master switch is in a position generally denoted at 80. This is accomplished by reading percentages directly from the heat and valve dial 66 by pressing the indicator switch 54 and moving the heat and valve dial knob until neither of the indicating lamps 50-52 is illuminated.

In the manual opening setting, generally denoted at 82, the control valve motor 14 operates continuously to open the control valve 12. The control is direct from the master switch 56 and the percentage of valve control opening may be read the same as at the valve indicate station 80.

Finally, in the manual close position 84, the valve control motor 14 operates continuously to close the control valve 12, and control is similarly under the direction of the master switch 56. The percentage of valve control opening may be read the same as in the valve indicate station 80.

It is noted that there are no settings or adjustments to be made at either the resistance thermometer or window selector stations because they are all calibrated at the control panel. These calibrations will be discussed in detail with reference to FIG. 2.

Figure 2:
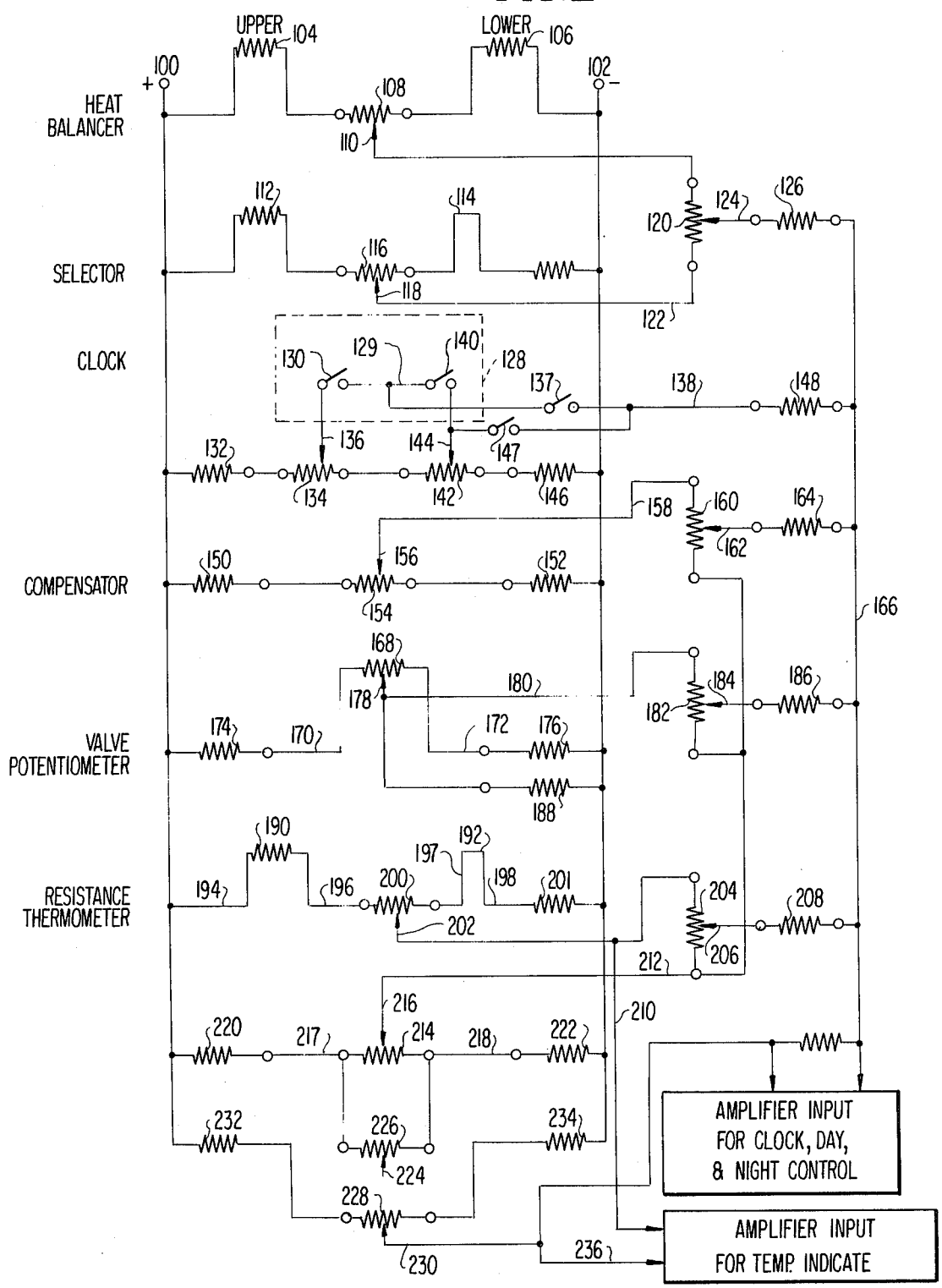
FIG. 2 is a wiring diagram of the control system of FIG. 1.

Referring now to FIG. 2, the bridge circuit elements are represented with those elements and components arranged for convenience of understanding and explanation. A source of direct current power, typically a rectifier bridge interposed between an AC power source, provides full wave rectification to achieve direct current through a positive lead 100 and a negative lead 102. This input circuit is appropriately fused with an AC fuse being located in the control panel in FIG. 1, generally indicated at 86. A first bridge leg is formed by the heat balancer resistances contained within unit 32. A hot air temperature resistance 104, or an upper sensor, is coupled to a cold air temperature resistance 106, or a lower sensor resistance, by a center-adjustment potentiometer formed by resistance 108 with contact 110. Centering adjustment potentiometer 108 with contact 110 forms a matching adjustment used to initially match circuits to make a mild weather adjustment 118 on the selector independent of the cold weather adjustment 124. The resistances forming the selector arm of the bridge network are formed by the window thermostat resistance 112, located in the heat selector 42 with shunt 114 separated by the mild weather adjustment resistance 116 and its contact 118. As indicated, contact 118 is coupled to the cold weather adjustment 120 via lead 122.

The cold weather adjustment, located at the control panel 20, comprises resistance 120 with wiper contact 124 and voltage dividing resistance 126. This adjustment is calibrated in degrees change in the temperature difference between the heat balancer coils 104 and 106 per degree change in the temperature of the window coil 112 of the selector 42.

As shown in FIG. 2, the contacts in the time switch 58 for night operation and heat-up are surrounded by the dotted lined box 128. The signal from the time switch on lead 129 is conducted to line 138 and voltage divider resistor 148 only when contacts 137 are made by the master switch 56 at the clock control position 64. During the day period of control, contacts 130 and contacts 140 are both open, thereby creating no signal on lead 129.

The heat-up period of control is initiated by closure of contacts 130 of the time switch 58, and hence lead 129 is connected to wiper contact 136 on heat-up compensating resistance 134. The compensating adjustment 134 is utilized to set the amount of the increase in the heat supply during the heat-up period. The higher the setting of element 136 on resistance 134, the more heat will be supplied to match the demand called for by the selector. The clock control switch 128 coupled to time switch 58 on the control panel 20 automatically initiates and discontinues the heat-up operation, and during this time, heat is supplied to the space at an increased rate.

The night period of control is initiated by closure of contacts 140 of the time switch 58, connecting lead 129 to wiper 144 on resistance 142. Contact 144 on resistance 142 sets the amount by which the heat supply is reduced at night from the basic day control heating temperature. The higher the setting of contact 144 on resistance 142, the greater the reduction in heat. Balancing resistors 132 and 146 form the remainder of the clock arm of this bridge network. When the master switch 56 is turned to night control position 70, contacts 147 close, continually coupling the reduced temperature signal to lead 138 and resistance 148.

The compensator arm is comprised of equal resistances 150 and 152 with compensation resistor 154 and wiper element 156 forming the substantive compensator adjustment. Movement of control knob 66 on compensator element 62 alters the position of wiper arm 156 to vary the rate of heat supply to the building during unusual weather conditions. A compensator range adjustment is coupled to contact 156 on line 158 by means of a resistor 160 with wiper arm 162. This range adjustment is used to vary the amount of effect that the compensator has in the control circuits. A voltage dividing resistor 164 is utilized to couple contact 162 to the line 166 which forms a substantive input to the amplifier circuitry for clock, day and night control.

As indicated herein, the position of the valve becomes a crucial aspect in the control of applicant's heat control system. Resistance 168 of the valve potentiometer is connected through leads 170 and 172 in series with resistances 174 and 176. Operation of the valve motor 14, to regulate the opening and closing of the valve, is electrically sensed by valve position sensor 178 coupled to valve potentiometer 168. A throttling differential adjustment, coupled to arm 178, is formed by lead 180 to resistance 182 with wiper arm 184. The setting of the adjustment of wiper arm 184 on resistance 182 determines the amount the position of the control valve will be changed if the temperature difference between the heat balancer coils 104 and 106 varies from the value corresponding to the rate of heat supply called for by the selector 42 and resistance thermometer 38. Accordingly, this adjustment value refers to the relative change in the temperature difference between the heat balancer sensors required to result in a given change in the control valve 12 opening. Resistance element 186 connects wiper arm 184 to lead 166 thereby forming a voltage divider element from line 166 to the amplifier input for clock, day and night control. Contact 178 is coupled to line 102 by means of resistance 188.

As previously indicated, valve 12 is controlled by motor 14 with sensor assembly 22 containing the elements of the valve potentiometer 168 and wiper 178. Through lead 24, the output of wiper 178 is conveyed to the control panel 20. As has been pointed out, operation of the motor 14 opens and closes the valve in a step-by-step movement, and the contact 178 of the potentiometer 168 is moved with each movement of the valve. The potentiometer 168 is interconnected by resistances 174 and 176 with other low impedance bridge arms to form a compound bridge circuit in the control panel 20. Each change in the valve opening is therefore in response to a condition of unbalance of one of the control bridge circuits, and the resulting effect of the change in potentiometer settings tends to rebalance the bridge circuit. The high impedance detector, which is the amplifier input for the control circuits, is connected to an intermediate point, line 166, in the coupling bridge as indicated in FIG. 2 and responds to a combination of electrical potentials at the output points of the individual bridge branches. By high impedance coupling circuits, resistances 126, 148, 164, 186 and 208, prevention of output potential in any one bridge branch from being affected significantly by current flow to other bridge branches is alleviated. In this way, the bridge branches may be permanently interconnected into the compound bridge circuit, Hence, the position of the contact arm 178 of the potentiometer 168 becomes crucial since it varies with changes in the valve opening thereby stabilizing the rate of heat supply into the system.

Similarly, of crucial importance is the resistance thermometer arm of the bridge circuit which comprises a temperature responsive resistance element 190 together with a shunt wire 192 disposed in room thermometer element 38. This resistance 190 is therefore subject to the temperature of the air within the space under control and is connected by leads 194 and 196 into the resistance network. The shunt wire 192 is coupled into the resistance network by means of leads 197 and 198 which couple the shunt 192 to resistance 200 and 201. Leads 194, 196, 197 and 198 are generally disposed schematically as shown in FIG. 1 in line 40. Resistance element 200 is disposed in the control panel 20 with wiper arm 202 coupled directly to the room temperature dial knob 68.

As previously indicated, the position of resistance thermometer element 190 is subject, dependent on particular application situs, to a wide variety of operating conditions which may affect the accuracy of the readings. For example, if the unit 38 is disposed in a drafty area, the readings obtained by resistance element 190 will not accurately reflect the average temperature within the space under control. In that regard, this system is a material improvement over the prior art by providing a positive control means for varying the effects of the resistance thermometer within the system. Coupled to contact 202, a temperature range adjustment comprising resistor element 204 and wiper 206 is interposed between the resistance thermometer circuit and line 166 by voltage dividing resistor 208. By appropriate setting of the wiper 206 on resistance 204, the relative change in the heat output of the heating system caused by a given change in the temperature as sensed by the resistance thermometer 190 can be varied. With the master switch 56 at the temperature indicate position 74, the resistance thermometer circuit is coupled to the input of the amplifier by means of line 210.

The control system, shown schematically in FIG. 2, contains range adjustments for the compensator, valve potentiometer and resistance thermometer networks. These range adjustments are made by coupling one end of each resistance element with line 212 to a center adjustment potentiometer, resistance element 214 with its associated contact 216. Elements 214 and 216 are used initially in matching the circuits to make the mild weather adjustment, with elements 116 and 118 independent of the temperature range adjustment elements 204 and 206. The mild weather adjustment, resistance 116 and contact 118, is calibrated in the temperature of the selector temperature sensitive element 112 above which the DAY control circuit will call for the heat supply to be entirely shut off. The centering adjustment for the temperature range, resistance 214, is coupled to the DC power source by means of leads 217 and 218 joining equal resistances 220 and 222.

Additionally, a centering adjustment for the valve indicate position 80 is provided by means of input 224 to resistance 226. This center adjustment is for indexing the valve and heat dial 62 with the opening of the control valve 12.

Finally, a centering adjustment for the temperature indicate position 74 is provided by means of resistance 228 and contact 230. This centering adjustment is calibrated for the room temperature dial 68 for room temperature indication. It is coupled to the source of DC power by means of equal resistors 232 and 234. The centering adjustment for the temperature indicate position is fed into the amplifier by means of line 236 to provide substantive indications of temperature in a means herein described.

In operation of the system, for completely automatic operation during all three periods of heating, namely, the DAY period, the NIGHT period and the HEAT-UP period, the master switch 56 is set to the clock control position and the compensator dial 66 is set with the indicator vertical in the normal position. The room temperature dial 68 is set to correspond to the room temperature desired during the DAY period of heating. By means of time switch 58, a completely automatic mode of operation is initiated between DAY, NIGHT and HEAT-UP. DAY control and NIGHT control are basically as previously indicated. Also, readings of room temperature at the resistance thermometer from the control panel 20 can be effectuated by setting the master switch to the temperature indicate setting 74 and depressing the indicator switch 54 with a corresponding movement of the room temperature dial 68 until neither of the indicating lamps 50, 52 lights up. The temperature indicated at this time by the knob 68 is the temperature of the room under control at the resistance thermometer. As previously indicated, in view of the fact that this resistance thermometer, denoted as element 38, may be positioned in areas where consistent accurate readings may be impossible, its effects can be effectively varied by means of adjustment control 206. The rate of heat supply at the control panel can similarly be measured along with the degree of valve opening and positioning in a manner heretofore explained.

In an illustrative embodiment of the present invention, steam is generally fed into the system under a pressure of approximately 2 to 10 pounds, preferably about 5 pounds, and is continuously available at the control valve 12 when heat is desired. As previously indicated, this invention constitutes an improvement over the prior panel constructions exemplified in U.S. Pat. Nos. 2,362,977 and 3,054,562. Many of the features in this illustrative embodiment are similar to corresponding features of the systems disclosed in those two patents. Many variations will be apparent to those having ordinary skill in the art which do not depart from the spirit of this invention.

I claim:

1. A balanced bridge-type control system for controlling the temperature within a space, a first bridge arm comprising a plurality of resistances (192, 200, 201) including a temperature-responsive resistance (190) disposed in said space, said first bridge arm having a pair of energizing terminals (100, 102), means coupled to said temperature responsive resistance to compensate for variations in said temperature responsive resistance due to environmental variations and placement of said resistance in said space (204, 206), a second bridge arm comprising a plurality of resistances including a resistance the value of which varies in response to changes in the basic demand for heating (112, 114), said second bridge arm having a pair of energizing terminals (100, 102), the respective energizing terminals of said first and second bridges being interconnected, signal lead means connected to said second bridge to provide a signal responsive to changes in the balance thereof (166), heat supply means (10, 12) including means (14) for altering the rate at which heat is delivered to the space, circuit means under the control of said heat supply means to produce a signal in accordance with the set rate at which heat is being supplied (104, 106), a connecting resistance circuit connecting said set signal to said signal lead means, said resistance circuit being formed by a plurality of high resistances (126, 148, 164, 186, 208) which are of such high value as to prevent interaction between the bridges, bridge energizing means for continuously furnighing electrical current to the interconnected energizing terminals of said first and second bridges, and sensing and controlling means to sense the potentials of said signal lead means and to control said heat supply means to alter the set rate of heat supply in accordance with the signals on said leads so as to tend to maintain a desired temperature in said space (20).

2. The control system of claim 1 wherein said temperature responsive resistance element is disposed in said space under control (38), and said means coupled to said temperature responsive resistance is disposed at a remote location to said space (20).

3. The apparatus of claim 1 wherein said resistance whose value varies in response to changes in the basic demand for heating is disposed in said space under control (42), and wherein said plurality of resistances in said second bridge arm form means to measure the percent of heat emission.

4. The apparatus of claim 1 wherein said sensing and control means includes means to measure the temperature in said space (68).

5. The apparatus of claim 1 wherein said sensing and controlling means includes means to measure the rate at which heat is being supplied (66, 78).

6. The apparatus of claim 1 wherein said means coupled to said temperature responsive resistance, compensates the opening of said heat supply means to thereby compensate for said measurement by the temperature responsive resistance (190).

7. The apparatus of claim 1 wherein said sensing and controlling means includes means to determine whether the temperature of said space is above or below preselected value (50, 52).

8. In a balanced bridge-type control system for controlling the temperature within a space, a first bridge arm comprising a plurality of resistances (192, 200, 201) including a temperature-responsive resistance (190) disposed in said space, said first bridge arm having a pair of energizing terminals (100, 102), means coupled to said temperature responsive resistance to compensate for variations in said temperature responsive resistance due to environmental variations in said space (204, 206), a second bridge arm comprising a plurality of resistances including resistances the values of which vary in response to changes in the basic demand for heating (112, 114) and to changes in the rate (104, 106) at which heat is being delivered to the space, said second bridge arm having a pair of energizing terminals (100, 102), the respective energizing terminals of said first and second bridges being interconnected, a signal lead connected to said second bridge to provide a signal responsive to changes in the resistances thereof (166), heat supply means (10, 12, 14) including means for altering the rate at which heat is delivered to the space, potentiometer circuit means (168) having a shiftable contact (178) positionable by said heat supply means in accordance with the rate at which heat is being supplied, the potential of said contact thereby being varied with changes in the set rate of the heat supply for the space, a connecting resistance circuit (126, 148, 164, 186, 208) connecting said signal leads to said potentiometer means contact, said resistance circuit being formed by a plurality of high resistances which are of such high value as to prevent interaction between the bridges, bridge energizing means for continuously furnishing electrical current to the interconnected energizing terminals of said first and second bridges and sensing and controlling means (20) to sense the potentials of said signal leads and to control said heat supply means in accordance with the signals on said leads so as to maintain the desired temperature in said space.

9. A control system as described in claim 8, wherein said connecting resistance circuit comprises a third bridge arm (232, 228, 234), having a pair of energizing terminals interconnected with the energizing terminals of said first and second bridges.

10. A control system for controlling the supplying of heat to a space in accordance with the demand as indicated by the temperature within the space and also in accordance with whether or not heat is actually being received by the air within the space at a rate equal to the basic demand, a resistance network forming a plurality of low impedance bridge arms having energizing and output terminals, means interconnecting said energizing terminals to provide continuous energization of said bridges (100, 102), said bridge arms including a temperature-sensitive resistance element (190) disposed in said space and arranged to produce on said output terminal a signal indicating whether or not the lead is being received at a rate equal to the basic demand, means coupled to said temperature sensitive element to compensate said signal for variations due to positioning of said element in said space (204, 206), high impedance coupling circuits (126, 148, 164, 186, 208) interconnecting the output terminals of said low impedance bridge arms and forming compound bridge elements, a high impedance detector connectible to said bridge output terminals to receive the signals thereon (20), and heating supply means (10, 12, 14) under the control of said detector and operable thereby to alter the set rate of heat supply in accordance with the magnitudes of said signals.

* * * * *